Sept. 19, 1967 R. L. WILLIAMS 3,342,240
TUBELESS TIRE REPAIR MEANS
Filed Oct. 8, 1965
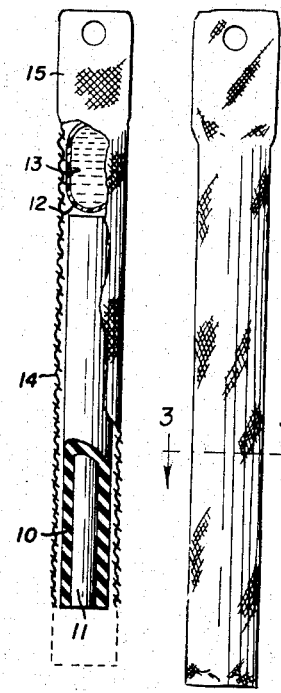
FIG. 2.
FIG. 1.
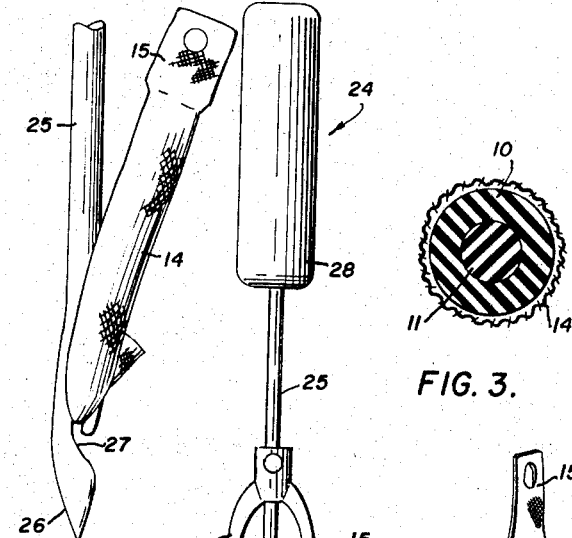
FIG. 4.
FIG. 3.
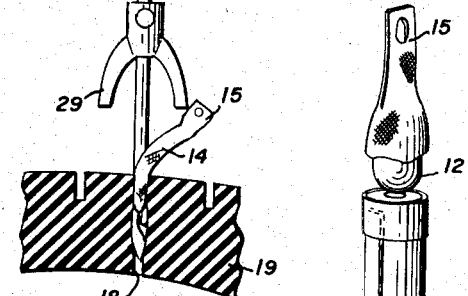
FIG. 5.
FIG. 6.
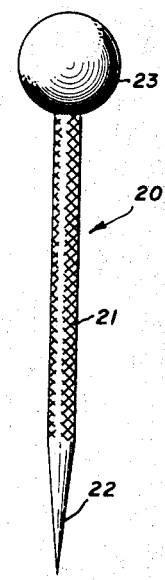
FIG. 8.
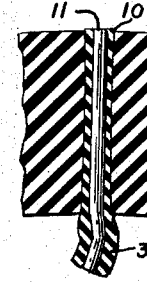
FIG. 7.
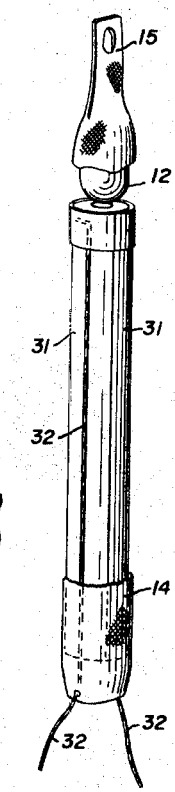
FIG. 9.
ROBERT L. WILLIAMS
INVENTOR.
BY Herbert J. Brown
ATTORNEY

United States Patent Office 3,342,240
Patented Sept. 19, 1967

3,342,240
TUBELESS TIRE REPAIR MEANS
Robert L. Williams, 1815 Skylark,
Arlington, Tex. 76010
Filed Oct. 8, 1965, Ser. No. 494,098
5 Claims. (Cl. 152—370)

ABSTRACT OF THE DISCLOSURE

Means for repairing a tubeless tire without removing the same from its wheel, said means being comprised of a cylindrical plug of resilient material for insertion in the puncture to be repaired, a frangible capsule containing a solvent at the outer end of the plug, a flexible tubular cover enclosing the plug and the capsule, and grip means integral with the cover outwardly of the capsule.

Being of flexible material, the inner end of the cover is adapted to be cut off, and the capsule may be broken by squeezing to cover the plug with the solvent.

This invention relates to means for repairing pneumatic tires and has reference to a plug type insert for repairing punctures in tubeless tires.

Although plug type inserts have been used heretofore for the repair of tubeless tires, they have not been entirely satisfactory because the solvent used to adhere the surface of the plug to the surface of the puncture area was wiped off during the plug inserting operation. The puncture, caused by a nail, screw or the like, was buffed by inserting a rough round instrument like a rat tail file, after which the plug was covered with a solvent and inserted in the puncture by means of a button hook type tool. The plug was necessarily of a larger diameter than the puncture, even after buffing, and consequently most of the solvent was wiped off of the plug by the squeezing action of the tire around the puncture.

An object of the present invention is to provide tubeless tire repair means including a plug of rubber or the like and wherein solvent applied to the surface of the plug will remain in place and bond the plug to the puncture surface.

Another object of the invention is to provide a repair plug for a tubeless tire, which plug will not stretch during the inserting operation, thereby lending to retaining solvent on the plug's surface.

A further object is to provide means, in that type of tire repair plug having a hard core and soft surface, which will not rub the soft surface off during the inserting operation.

Another object is to provide plug type repair means for tubeless tires including a frangible capsule containing a suitable solvent and whereby such solvent is always readily available.

A further object is to provide repair means for tubeless tires requiring only simple tools, and means whereby repairs may be made anywhere.

These and other objects of the invention will become apparent from the following description and the accompanying drawing, wherein:

FIGURE 1 is an elevational view of a tubeless tire repair device according to the invention.

FIGURE 2 is a fragmentary sectional and elevational view of the device illustrated in FIGURE 1.

FIGURE 3 is an enlarged transverse sectional view taken on line 3—3 of FIGURE 1.

FIGURE 4 is an elevational view showing the device engaged by a tool for insertion in a tire to be repaired.

FIGURE 5 is an elevational view of the tool and repair device partially inserted in a puncture in a tire, the latter being shown in fragmentary section.

FIGURE 6 is an elevational and sectional view of the device in a tire prior to removing the tubular cover from the plug.

FIGURE 7 is a sectional view similar to FIGURE 6, but showing the tubular cover removed.

FIGURE 8 is an elevational view of a buffing tool for roughening the wall of the puncture, and FIGURE 9 is a partilly fragmentary perspective view of a modified form of the invention.

Referring now to FIGURES 1 and 2, a tire repair device according to the invention consists of a soft elongate cylindrical plug 10 of rubber or the like which may have a core 11 of hard rubber or other material capable of long wear. At one end of the plug 10 there is a frangible capsule 12 containing a suitable solvent 13. Solvents for bonding rubber and synthetic rubber are well known to the art, and such solvent is not therefore herein described in detail.

The plug 10 and capsule 12 are entirely enclosed in a cover 14 of tubular plastic, for example, closely woven nylon fabric, and that portion of the cover outwardly of the capsule is flat and opposite inner surfaces are sealed to each other to provide a gripping tab 15.

A puncture 18 in a tire 19 is first roughened by means of a tool 20 such as illustrated in FIGURE 8, and which tool consists of a round file portion 21, a pointed end 22 and a knob or handle 23.

The end of the tubular plastic cover 14 opposite the capsule 12 is cut off to match the end of the plug 10 as shown by means of dotted lines in FIGURE 2. The capsule 12 within the cover 14 is then squeezed and broken, causing the solvent 13 to cover the plug 10. Excess solvent 13 is wiped on the cover 14 to provide a lubricant.

The tool 24 shown for inserting the plug 10 is comprised of a shank 25, a pointed end 26, a notch 27 in the side of the pinted end, a handle 28 and stops 29 on the shank. The open end portion of the cover 14 and that end of the plug 10 contained therein are engaged in the notch 27 of the tool 24 and both are inserted in the puncture 18. Because the diameter of the plug 10 is larger than the puncture, that portion of the plug extending within the tire 19 is larger than the compressed portion of the plug as shown in FIGURE 7. The cover 14 is then withdrawn by pulling the tab 15. This last operation leaves the solvent in place as the cover 14 is removed. The remaining extending portion, if any, of the plug 10 is then trimmed flush with the outer surface of the tire 19.

The form of the invention shown in FIGURE 9 is like the foregoing except two adhesive covers 31 are provided around the cylindrical surface of the plug 10. The adhesive cover is divided into two longitudinal halves and each is folded at the top to secure the upper ends of pull strings 32, the lower ends of which extend through and below the tubular cover 14. The adhesive cover 31 is removed by pressing up on the end of the tubular cover 14 and pulling down on the pull strings 32. The resulting bunched adhesive cover is removed at the time the lower end of the tubular cover 14 is cut off. Otherwise, the operation is according to the first described form of the invention.

The invention is not limited to the exemplary construction herein shown and described, but may be made in various ways within the scope of the appended claims.

What is claimed is:

1. A tire repair device comprised of a cylindrical plug of resilient material having inner and outer ends, a frangible capsule containing a solvent at the outer end of said plug, a flexible tubular cover enclosing said plug and said capsule, and grip means integral with said cover outwardly of said capsule.

2. A tire repair device as defined in claim 1, and including a wrapper around said plug and said capsule, and at least one tear string within said wrapper.

3. A tire repair device as defined in claim 1, and including a core within and extending the length of said plug.

4. A tire repair device as defined in claim 1, and wherein said grip means is comprised of an elongate portion of said tubular cover, opposing surfaces of which are flat and sealed together.

5. A tire repair device as defined in claim 1, and including an adhesive cover around the surface of said plug, and pull means removing said adhesive cover from said plug.

References Cited

UNITED STATES PATENTS 2,585,635  2/1958  Dibble _____ 152—37 X

ARTHUR L. LA POINT, *Primary Examiner.*

C. W. HAEFELE, Y. P. SCHAEVITZ,
*Assistant Examiners.*